United States Patent
Davis

(10) Patent No.: US 10,510,096 B2
(45) Date of Patent: Dec. 17, 2019

(54) VISITOR DETECTION UNIT AND IDENTIFICATION SYSTEM

(71) Applicant: GROUPON, INC., Chicago, IL (US)

(72) Inventor: Ruddman Davis, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 87 days.

(21) Appl. No.: 15/926,170

(22) Filed: Mar. 20, 2018

(65) Prior Publication Data

US 2019/0095952 A1 Mar. 28, 2019

Related U.S. Application Data

(63) Continuation of application No. 14/283,151, filed on May 20, 2014, now Pat. No. 9,953,493.

(51) Int. Cl.
*G06Q 30/02* (2012.01)
(52) U.S. Cl.
CPC ................. *G06Q 30/0261* (2013.01)
(58) Field of Classification Search
CPC .. G08B 25/009; G08B 25/08; G08B 13/1427; G06F 19/3418; G06F 19/3406; G06Q 30/0261
See application file for complete search history.

(56) References Cited

U.S. PATENT DOCUMENTS

| | | | |
|---|---|---|---|
| 7,123,139 B2 | 10/2006 | Sweeney | |
| 7,683,773 B1 | 3/2010 | Goodall et al. | |
| 8,222,990 B2 | 7/2012 | Gerner et al. | |
| 9,349,128 B1 * | 5/2016 | Kerr | G06Q 30/0261 |
| 2007/0159330 A1 | 7/2007 | Chakraborty et al. | |
| 2008/0297354 A1 | 12/2008 | Foley et al. | |
| 2011/0163231 A1 | 7/2011 | Salmon | |
| 2014/0135042 A1 | 5/2014 | Buchheim et al. | |
| 2015/0248702 A1 * | 9/2015 | Chatterton | G06Q 30/0261 705/14.58 |

* cited by examiner

*Primary Examiner* — James J Yang
(74) *Attorney, Agent, or Firm* — Alston & Bird LLP

(57) ABSTRACT

A visitor detection unit includes a digital processor, an RF transceiver, a sensor and digital memory. Preferably, the digital memory includes code segments executable on the digital processor for transmitting a beacon signal via a transmitter portion of the RF transceiver, monitoring via the sensor for a visitor event monitoring via a receiver portion of the RF transceiver for a beacon response event, and selectively transmitting metadata via the transmitter portion of the RF transceiver that is related at least one of the visitor event and the beacon response event. In this example embodiment, an enclosure is provided for the digital processor, the RF transceiver and the digital memory such that the visitor detection unit can be mounted on a surface proximate to a physical area to be monitored.

22 Claims, 11 Drawing Sheets

VISITOR DETECTION UNIT AND IDENTIFICATION SYSTEM

This application is a continuation of U.S. application Ser. No. 14/283,151, titled "VISITOR DETECTION UNIT AND IDENTIFICATION SYSTEM" filed May 20, 2014 of which is hereby incorporated by reference.

BACKGROUND

Despite the increasing popularity of online shopping, the vast majority of retail sales in the U.S. still take place in physical stores. According to U.S. Department of Commerce statistics, 90% of all retail sales in 2013, amounting to $4.3 trillion, occurred in physical stores. These staggering numbers were generated by an estimated 283 million U.S. consumers who visited physical retail locations in that year.

Unlike online sales, it is difficult to measure traffic, conversion rates, etc. in physical stores. In fact, most stores do not even keep accurate count of the number of visitors that walk through their doors. Door monitors, if they have them, tend to simply alert the proprietor as to the opening or passing through of a door, without any indication as to whether the visitor is entering or leaving the establishment and without saving information for later analysis.

To partially address this issue, a variety of systems have been developed to measure the number and direction of people traversing a particular passage or entrance per unit time. These systems are known variously as "foot traffic counters", "people counters" and the like, and use a variety of technologies including infrared (IR) beams, computer vision, thermal imaging and pressure-sensitive mats. In the retail setting, foot traffic counters can be used to help the retailer determine a store's conversion rate (e.g. the percentage of a store's visitors that make purchases), can be used to optimize the staffing schedule for the store, etc. More advanced foot traffic counters can be used for queue management and customer tracking. Despite the advantages of foot traffic counting, it is estimated that less than 25% of major retailers track foot traffic in their stores.

Traf-Sys Inc. of Pittsburgh, Pa. provides a line of people counting sensors based upon computer vision and thermal (IR) sensing technologies. The Traf-Sys people counting sensors include overhead people counting sensors, which require wired network connections, and horizontal people counting sensors, which can wirelessly communicate with a dedicated Data Controller or which simply have a display.

A significant cost of installing networked monitoring systems is running wires between the various sensing devices and a central controller or hub. An increasingly popular wireless technology for connecting devices is known as Bluetooth Low Energy (BLE). BLE hardware and software protocols are part of the Bluetooth 4.0 specification, released in 2010, incorporated herein by reference. Devices using the BLE standards for communication purposes consume much less power compared to devices using the previous "classic" Bluetooth standards, making it advantageous for battery-powered systems. Bluetooth low energy uses the same RF frequency spectrum range (2.4 GHz-2.4835 GHz) as classic Bluetooth, but the BLE protocol has lower data transfer rates. Both BLE and classic Bluetooth signals can reach up to about 100 meters.

BLE communication implements two main processes for linking devices, namely advertising and connecting. Advertising is a one-way discovery mechanism for BLE devices ("discoverable devices"). Discoverable devices can transmit data packets in intervals from about 20 ms to about 10 seconds. The packets can be up to 47 bytes in length and include a 1 byte preamble, a 4 byte access address, a 2-39 byes advertising channel Protocol Data Unit (PDU), and a 3 bytes Cyclic Redundancy Check (CRC). The PDU, in turn, has a 2 byte header, a 6 byte Media Access Control (MAC) address, and up to 31 bytes of data.

A form of one-way wireless digital communication is to provide a beacon signal. As used herein, a "beacon signal" or "beacon" will refer to a digital radio frequency (RF) signal comprising one or more data packets transmitted on a periodic or non-periodic basis. The devices which produce beacon signals are also sometimes, themselves, referred to as "beacons," but will be referred to herein as "beacon devices" or "devices" to avoid confusion with beacon signals.

Beacons based on BLE technology use only the advertisement channel of the BLE protocol. As the name suggests, a beacon transmits data packets at regular intervals which can be detected by compatible BLE-enabled devices such as smartphones. An advantage of BLE beacon devices is their low power consumption. For example, some BLE beacon devices can transmit beacons for several years, even when powered only by a small battery.

In June of 2013, Apple released its iBeacon™ profile, based upon BLE protocols, as part of its new iOS 7 operating system. With the iBeacon profile, the data portion (up to 31 bytes) of the data packet has a 9 byte iBeacon prefix, a 16 byte proximity UUID, a Major Number field of 2 bytes, a Minor Number field of 2 bytes, and 2 bytes of TX power. A new feature of iOS 7.1 allows a detected iBeacon signal to automatically activate an application ("app") on, for example, an iPhone® (when permitted). That is, a potential use for iBeacon devices is to provide location-aware, context-aware, pervasive small wireless devices that can be used to accurately locate a store visitor's location within, for example, a store. However, the iBeacon devices cannot be used to detect visitors who do not have an iPhone, Android, or other smartphone compatible with iBeacon technology, or who have not turned on their smartphones, or who do not have a smartphone application that is both executing on the smartphone and compatible with the iBeacon signals, or do not have their Bluetooth enabled, or who have not given permission for iBeacon interaction for privacy reasons.

These and other limitations of the prior art will become apparent to those of skill in the art upon a reading of the following descriptions and a study of the several figures of the drawing.

SUMMARY

In an embodiment, set forth by way of example and not limitation, a visitor detection unit includes a digital processor, an RF transceiver coupled to the digital processor, a sensor coupled to the digital processor and digital memory coupled to the digital processor. In this example embodiment, the digital memory includes code segments executable on the digital processor for transmitting a beacon signal via a transmitter portion of the RF transceiver, monitoring via the sensor for a visitor event, monitoring via a receiver portion of the RF transceiver for a beacon response event, and selectively transmitting metadata via the transmitter portion of the RF transceiver that is related at least one of the visitor event and the beacon response event. In this example embodiment, an enclosure is provided for the digital processor, the RF transceiver and the digital memory such that the enclosure can be mounted on a surface proximate to a physical area to be monitored for foot traffic.

In an embodiment, set forth by way of example and not limitation, a digital processor implemented method for detecting visitors includes transmitting a beacon signal with an RF transmitter, monitoring with a passive infrared (PIR) motion detector for a visitor event, monitoring with an RF receiver for a beacon response event, and selectively transmitting metadata with the RF transmitter that is related to at least one of the visitor event and the beacon response event. By way of non-limiting examples, the RF transmitter and RF receiver are can be compatible with a Bluetooth Low Energy (BLE) standard and the beacon can be compatible with an iBeacon™ standard of Apple Inc.

In an example, set forth by way of example and not limitation, a non-transient computer readable medium containing program instructions for causing a digital processor to perform a method including: (a) code segments for establishing a Bluetooth Low Energy (BLE) link with a visitor detection unit; (b) code segments for communicating with the visitor detection unit using the BLE link; and (c) code segments for communicating with a system server over a wide area network. In certain embodiments, set forth by way of example and not limitation, the non-transient computer readable medium is part of a wireless mobile device such as a smartphone or tablet computer. For example, the non-transient computer readable medium can be in a visitor's smartphone or in a store's tablet computer. In other example embodiments, also set forth by way of example and not limitation, the transient computer readable medium is part of other types of computing devices such as personal computers, servers, routers, embedded systems, etc.

In embodiment, set forth by way of example and not limitation, a system server comprises a digital processor, a network interface coupling the digital processor to the Internet; and digital memory coupled to the digital processor including code segments executable on the digital processor. In an embodiment, set forth by way of example and not limitation, the provided codes segments implement the functions of: (a) receiving, via the network interface, from a visitor wireless mobile device associated with a beacon generated by a visitor detection unit, including receiving at least one of user information, application information, and device information from the wireless mobile device; (b) receiving, via the network interface, from a collector device which has collected visitor event data from the visitor detection unit using a Bluetooth Low Energy (BLE) communication; (c) correlating the at least one of user information, application information, and device information received from the wireless mobile device with the visitor event data received from the collector device to produce multisource correlated data for an identifiable individual; and (d) updating a customer profile database using, at least in part, the multisource correlated data to create an updated customer profile for the identifiable individual.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
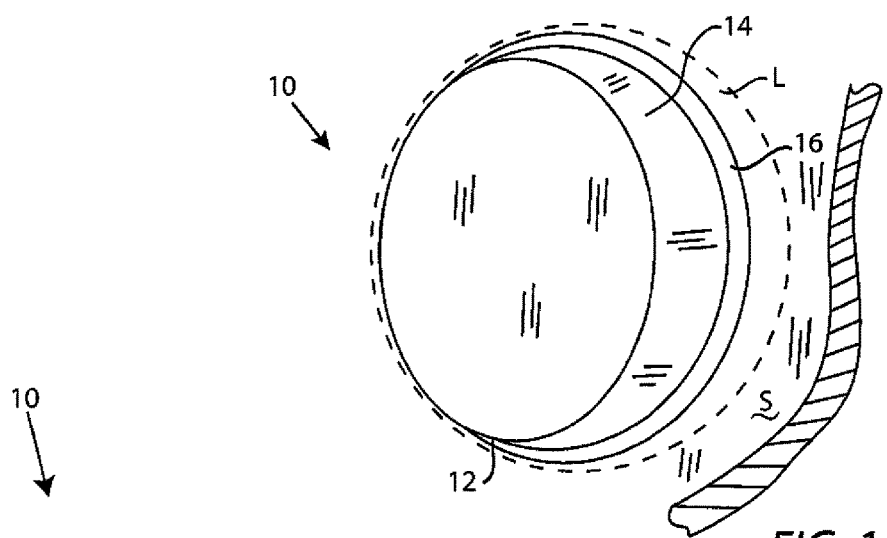
FIG. 1 is a perspective view of an example visitor detection unit.

FIG. 1 is a perspective view of a visitor detection unit 10, set forth by way of example and not limitation. In this example embodiment, the visitor detection unit 10 includes a generally circular prismatic cover 12 having a decorative bevel 14. The cover 12 is preferably made from a generally opaque thermoplastic material that is provided with a small window that is transmissive of infrared (IR) light for a purpose to be discussed subsequently. A portion of cover 12 is formed as a translucent ring 16 which allows a light L to be projected against the surface S. The light L can be used as a status display for the visitor detection unit 10 by varying its color, intensity, blinking it on and off, etc.

Figure 2:
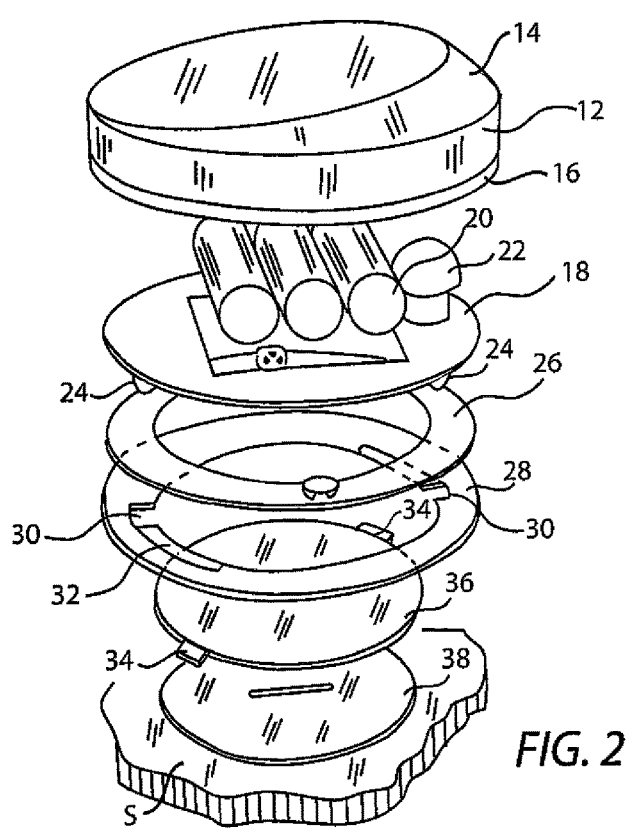
FIG. 2 is an exploded perspective view of the example visitor detection unit of FIG. 1.

FIG. 2 is an exploded perspective view of the example visitor detection unit 10. The cover 12 fits over a printed circuit board (PCB) 18 which supports a number of the electronic and electronic components of the visitor detection unit 10 including a battery pack 20 and a passive infrared (PIR) motion detector 22 which is aligned with the aforementioned IR window of the cover 12. The PCB 18 also includes one or more light emitting diodes (LEDs) 24 which can be controlled to produce the light L of FIG. 1. In other example embodiments, an alternating current (AC) to direct current (DC) power supply, known variously as an AC adapter, AC/DC adapter, AC/DC converter, or "wall wart", can be used to replace or supplement the battery pack 20.

It should be noted that PIR motion detector 22 is just one example of a sensor that can be used in a visitor detection unit. By "sensor", it is meant any electrical or electronic device which can detect the presence and/or passage of a visitor, who is typically walking by, or approaching, the sensor. For example, a sensor can be an optical detector, a capacitive detector, a beam detector, a sonic detector, a pressure plate, a radio-frequency (RF) signal detector (e.g. of cellular telephone, Bluetooth, Near Field, or WiFi signals)

etc. However, the PIR motion detector 22 is preferred, in certain non-limiting examples, in that it does not require complex installation or alignment processes and is highly accurate in detecting true portal ingress and egress. A suitable PIR motion detector is available as a MP Motion Sensor (AMN1,2,4) from Panasonic Corporation of Osaka, Japan. This sensor detects changes in infrared radiation which occurs when there is movement by a person who is at a different temperature (usually warmer) than the ambient environment.

With continuing reference to FIG. 2, beneath the PCB 18, and adjacent to the LEDs 24, is a clear, plastic light ring spacer 26 which covers a clear, plastic light ring 28. When the visitor detection unit 10 is assembled, the light ring spacer 26 and the light ring 28 are generally aligned with the translucent ring 16 of the cover 12 so that the light L may be projected against the mounting surface S. The light ring 28 is provided with slots 30 and grooves 32 to engage tabs 34 of a battery access panel 36. Collectively, cover 12, light ring 28, and battery access panel 36 comprise an enclosure which encloses and protects the electrical and electronic components of the visitor detection unit 10. Double-sided foam tape 38 can be used to attach the enclosure slightly above the surface S so that the light L can be clearly seen.

Figure 3:
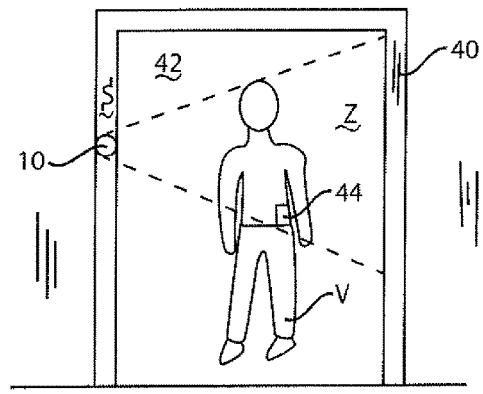
FIG. 3 illustrates an example placement of the example visitor detection unit attached to a door frame to monitor ingress and egress through a door.

FIG. 3 illustrates an example placement of a visitor detection unit 10 on a surface S which forms part of a door frame 40. A visitor V is shown to be approaching the door opening ("portal") 42. The visitor detection unit, in this example embodiment, is monitoring a partially conical zone Z with a PIR motion detector due to the aforementioned IR window provided in its cover. The visitor V may, or may not, be carrying a smartphone, such as an iPhone made by Apple Inc., of Cupertino, Calif.

Figure 4:
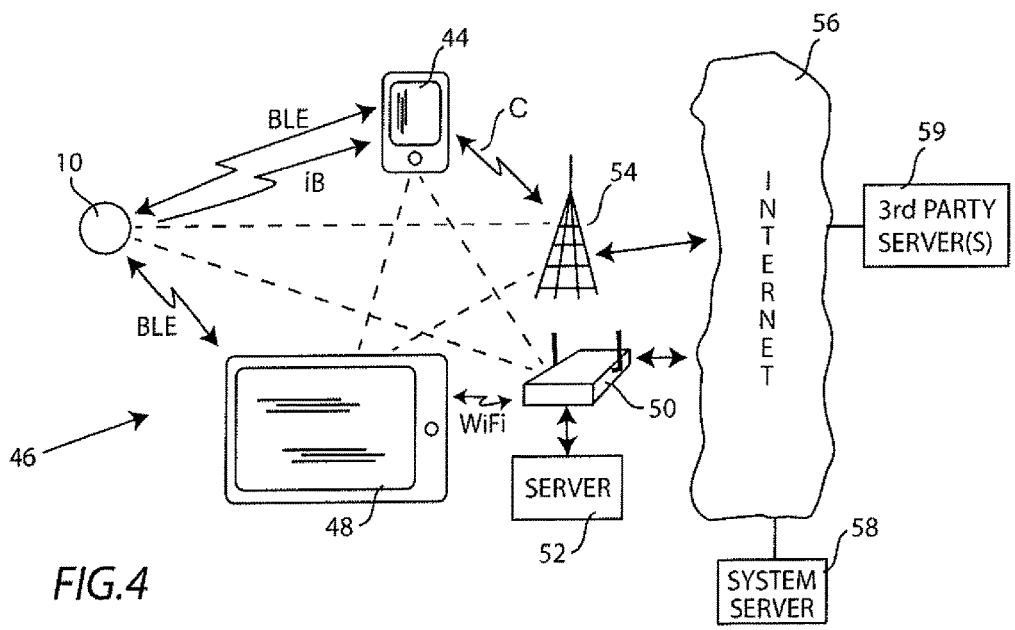
FIG. 4 illustrates various communication channels between the example visitor detection unit and other devices, apparatus and systems of an example visitor identification system.

FIG. 4 illustrates various communication channels between an example visitor detection unit 10 and other devices, apparatus and systems of an example visitor identification system 46. For example, the example visitor identification system 46 can include a smartphone ("wireless mobile device") 44, a tablet ("collector" or "collector device") 48, a wireless router 50, a local area network (LAN) server 52, a cellular tower 54, the Internet 56 and a visitor identification system server 58. It should be noted that other devices, apparatus and systems can be used to achieve the same or similar results. For example, the functionality of the collector 48 and the wireless router 50 can be combined. Also, as used herein, a "cellular telephone system" will refer to a communication system, provided by a telephone company or data carrier, which is capable of wireless data transmission (e.g. 3G, 4G, LTE, etc.).

With continuing reference to FIG. 4, the solid lines between devices, apparatus and systems designate preferred example connections or communication channels, while the broken lines represent alternative example connections or communication channels. In this example, communication between the visitor detection unit 10 and wireless portable device 44 is by an iBeacon signal iB (a one directional communication) and by BLE communication BLE (a two directional communication). The communication between visitor detection unit 10 and collector 48 is, in this example embodiment, by BLE communication. Of course, other communication channels, such as by WiFi (IEEE 802.11) communication can be used, but are considered to be less desirable due to their relative complexity and high power consumption. However, in this example, the communication between collector 48 and wireless router 50 is illustrated to be by WiFi, and the communication between wireless router 50 and server 52 is shown to be hard wired. Also, in this example, the wireless mobile device 44 is shown to be communicating over the cellular data system C. However, after the visitor Z with the wireless mobile device 44 enters the store, this communication channel may switch to communicate over the WiFi system using wireless router 50. Both the cell tower 54 and the wireless router 50 allow communication with a system server 58 and/or third party server(s) 59 over the Internet 56. By way of a non-limiting example, a third party server 59 can be an ad server or ad exchange server.

As used herein, "beacon signals" or "beacons" will refer to a digital radio frequency (RF) signals, each comprising one or more data packets, which are typically transmitted on a periodic basis, but which can also be transmitted asynchronously. As noted previously, devices which produce beacon signals are also sometimes referred to as "beacons," but will be referred to herein as "beacon devices" or "devices" to avoid confusion with beacon signals. One type of beacon signal is based upon the BLE standards ("BLE beacon signal" or "BLE beacon") and a subset of BLE beacon signals is an iBeacon™ signal ("iBeacon"). Beacon devices can be dedicated standalone devices, and can also be other types of devices or systems capable of transmitting iBeacon signals. For example, the iPhone® of Apple, Inc. can be configured as an iBeacon device.

Figure 5:
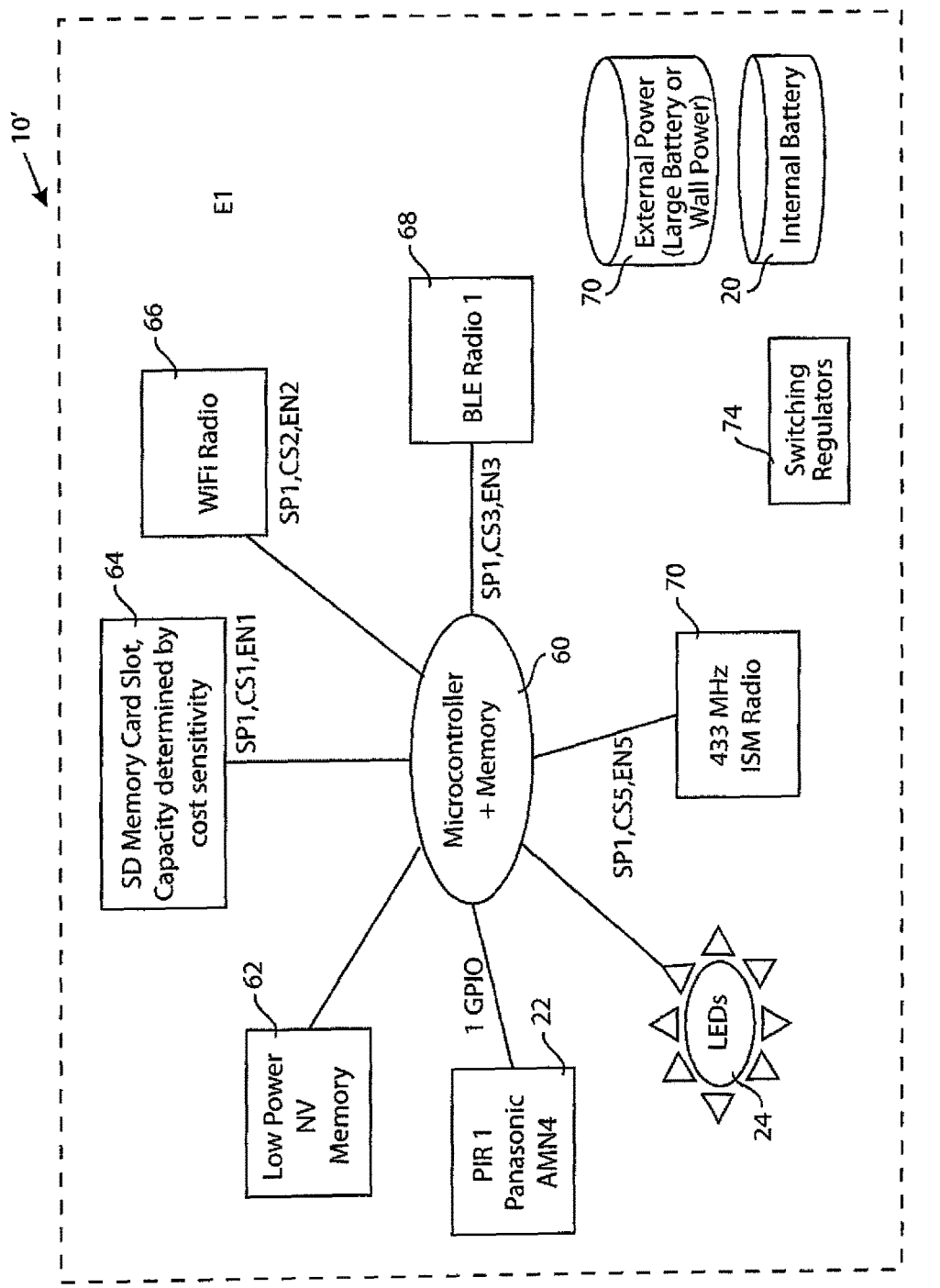
FIG. 5 is an illustration of various components of an example alternative visitor detection unit.

FIG. 5 is an illustration of various electrical and electronic components E1 of an alternative example visitor detection unit 10'. The electronic components E1 can be mounted, in whole or in part on, for example, the PCB 18 of FIG. 2. In this embodiment, set forth by way of example and not limitation, a microcontroller/memory 60 forms a hub for a PIR motion sensor (e.g. a Panasonic AMN4 motion sensor) 22, a low-power non-volatile (NV) memory 62, a Secure Digital (SD) memory card slot 64, a WiFi (e.g. IEEE 802.11x) radio 66, a BLE radio 68, a 433 MHz Industrial, Scientific and Medical (ISM) radio 70 and LEDs 34. In this embodiment, external power 70, such a large external battery or wall power, can be used instead of, or in addition to, the internal battery pack 20. Switching regulators 74 can be used to provide stable power to the circuitry.

Figure 6:
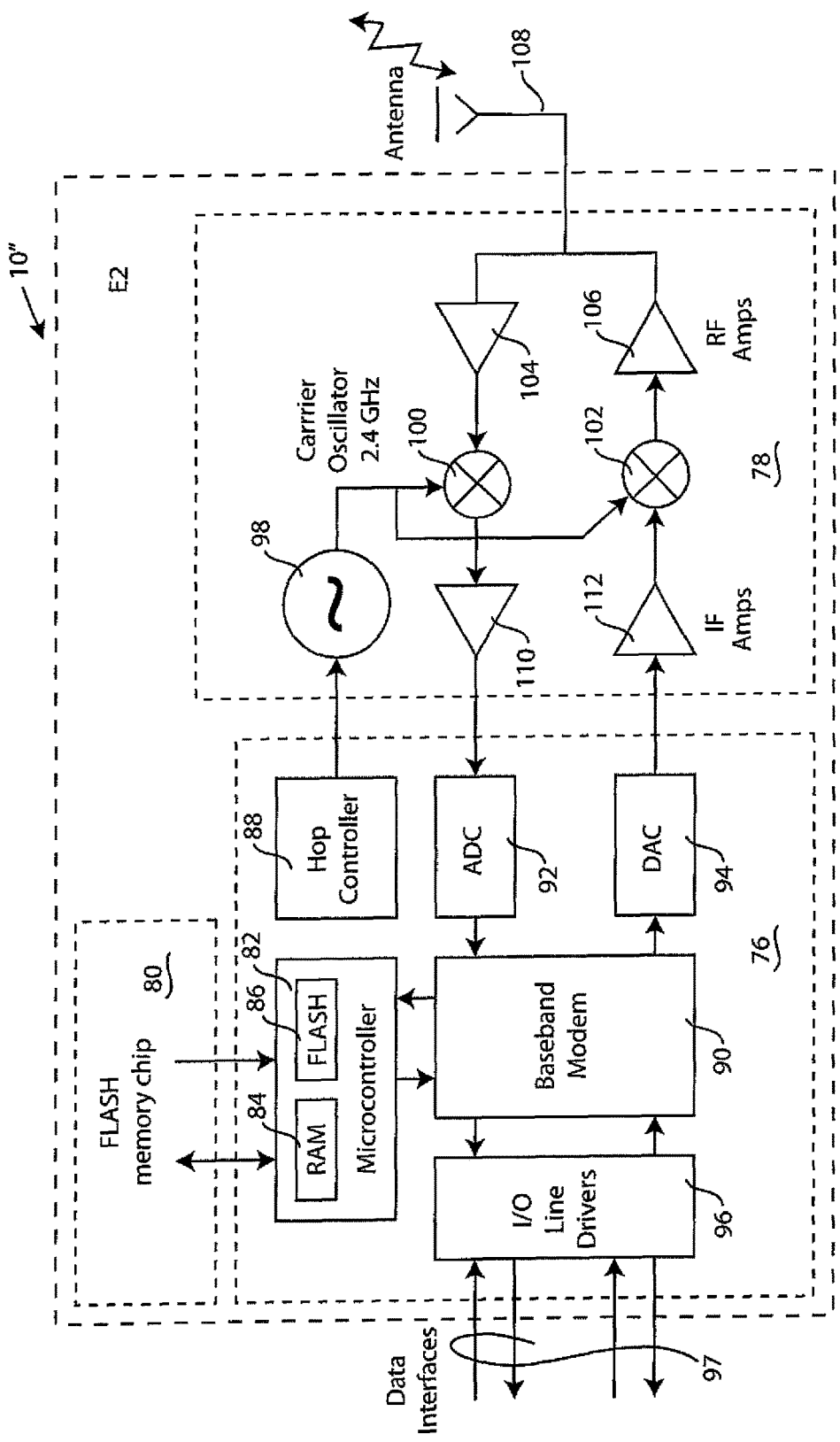
FIG. 6 is a block diagram of certain digital and analog electronic components of an example alternative visitor detection unit.

FIG. 6 is a block diagram of various electrical and electronic components E2 (which could be carried in whole or in part on PC board 18 of FIG. 2) of an example alternative visitor detection unit 10" which includes a digital section 76, an analog radio-frequency (RF) section 78, and a large flash memory 80. The digital section 76 includes a microcontroller 82 provided with random access memory (RAM) 84 and a smaller flash memory 86. The microcontroller 82 is coupled to a hop controller 88 to control the frequency hops of the analog RF section 78. A baseband modem 90 coupled to the microcontroller for bidirectional communication, and has an analog-to-digital converter 92 as an input and a digital-to-analog converter 94 as an output. Input/Output ("I/O") drivers 96 provide data interfaces 97 to the baseband modem 90.

The analog RF section 78 includes a carrier oscillator 98 controlled by the hop controller 88 and has an output coupled to mixers 100 and 102. Mixer 100 is coupled to an antenna 108 by a receiver RF amplifier 104 and has an output coupled to an analog-to-digital converter (ADC) 92 by an intermediate frequency (IF) amplifier 100. Mixer 102 is coupled to the output of a digital-to-analog converter (DAC) 94 by an IF amplifier 112 and has an output coupled to transmitter RF amplifier 106 to drive the antenna 108.

Figure 7:
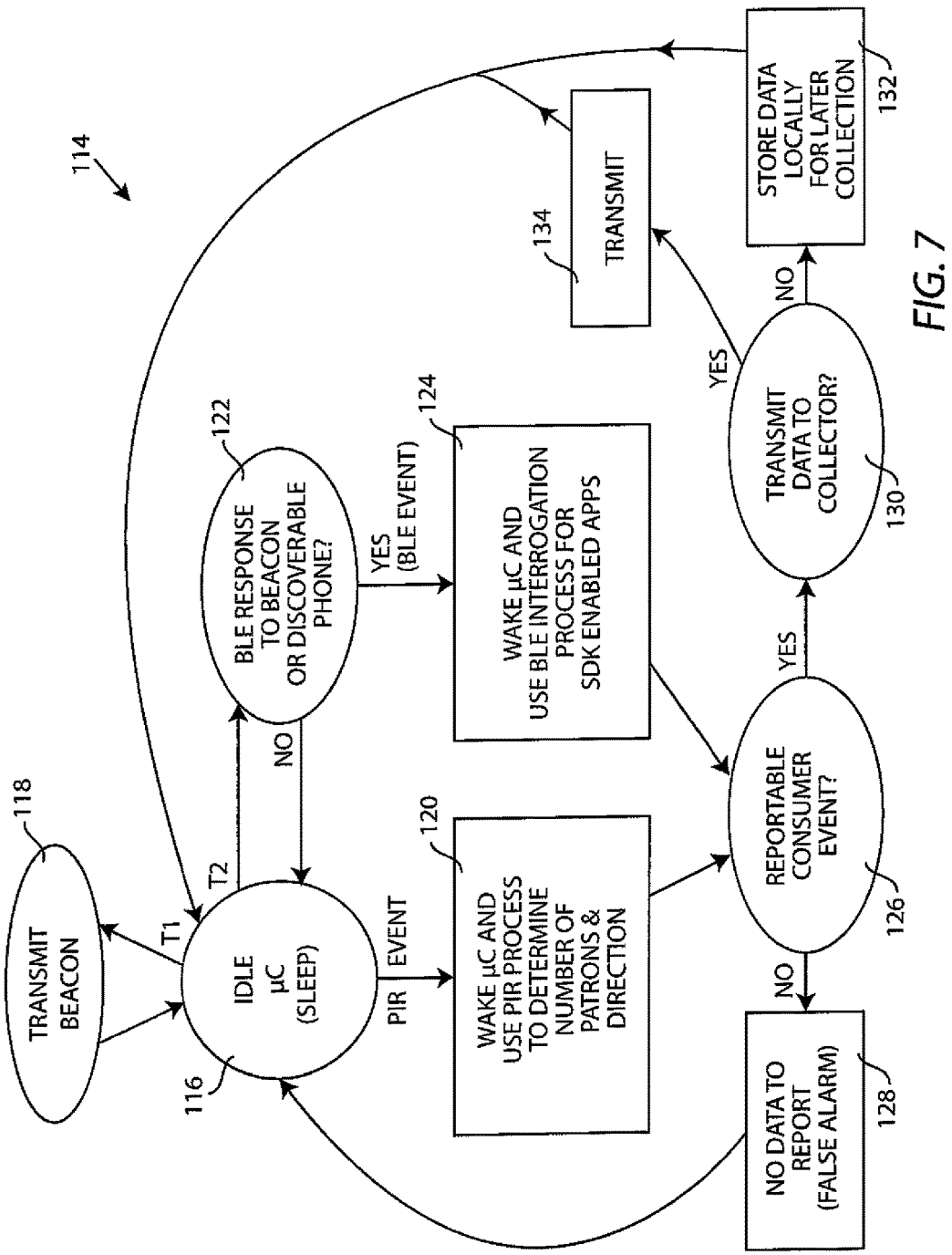
FIG. 7 is a flow diagram illustrating certain example states and processes of the example visitor detection unit.

FIG. 7 is a flow diagram illustrating certain example states and processes 114 of a visitor detection unit 10. In this example embodiment, process 114 idles in an idle operation 115 with the microcontroller being in a "sleep mode" to conserve energy. By "sleep mode" it is meant that the microcontroller is mostly, but not entirely, powered-down such that it can be "awakened" quickly by a timed or asynchronous interrupt of the sleep cycle.

In this example embodiment, every T1 seconds the microcontroller is awakened with a timed interrupt and a beacon (e.g. an iBeacon) signal is transmitted in an operation 118, after which the microcontroller goes back to sleep. By way of non-limiting examples, T1 can be in the range of about $\frac{1}{20}^{th}$ of a second to about 2 seconds, or more preferably in the range of about $\frac{1}{10}^{th}$ of a second to about ½ second. However, if at any time a PIR event occurs, e.g. a visitor passes through portal 42, an operation 120 will "wake up" the microcontroller asynchronously and will implement a PIR process to determine the number of visitors who have passed the threshold and their direction(s) of travel (e.g. in or out of the store). Also, every T2 seconds, an operation 122 determines if there is a BLE response to a beacon signal by, for example, the wireless mobile device 44. T2, in this non-limiting example, is greater than or equal to T1 so that a response to the beacon signals is not missed. By way of non-limiting example, T2=T1+Δt, where 0≤Δt≤5 seconds. If there is no BLE response detected, the microcontroller goes back to sleep. However, if a BLE event is detected by operation 122, and operation 124 wakes the microcontroller and uses a BLE interrogation process of, by way of non-limiting example, a Software Design Kit (SDK) enabled application ("app") of the wireless mobile device 44.

It will be noted that an SDK enabled app is only one way of enabling the aforementioned functionality, which can also be enabled by code segments inserted in to the wireless mobile device 44 operating system (e.g. the iOS or Android operating system) or into an application, utility or protocol stack or as part of an Application Programming Interface (API). The aforementioned SDKs, operating systems, APIs, etc. are simply examples of code segments stored in non-transitory memory to implement processes as set forth herein, and are not intended to be limiting the code segments to any particular form, type or structure.

In the example process 114 of FIG. 7, after either of operations 120 or 124 it is determined if there is a reportable consumer event. If not, an operation 128 determines that there is no data to report (i.e. it was a false alarm) and process control is returned to idle operation 116. If there is a reportable consumer event, an operation 130 determines whether it should be transmitted to the collector. If not, the data is stored locally (e.g. in flash memory) for later collection and process control is returned to idle operation 116. Otherwise, the data is transmitted in an operation 134 before returning to idle operation 116.

By way of non-limiting example, the visitor event metadata can include the type of visitor event (e.g. was it an ingress or an egress?) and a timestamp. For example, the metadata could take the form of {<type>, Y,Y,M,D,H,M,S}, taking only 8 bytes. By way of further non-limiting example, the beacon event metadata can include a great deal of information derived from the wireless mobile device 44 such as user information, application information and device information, in addition to timestamp information. For example, the metadata could take the form of {SwarmID, ParnerID, Proximity UUID, Y,Y,M,D,H,M,S}, taking 10 bytes. By way of a further non-limiting example, a visitor event is associated with metadata comprising a at least one of passing information, direction and presence. For example, only passing information may be known without knowing the direction of travel. Also, the visitor event can be simply presence or lack thereof.

Figure 8:
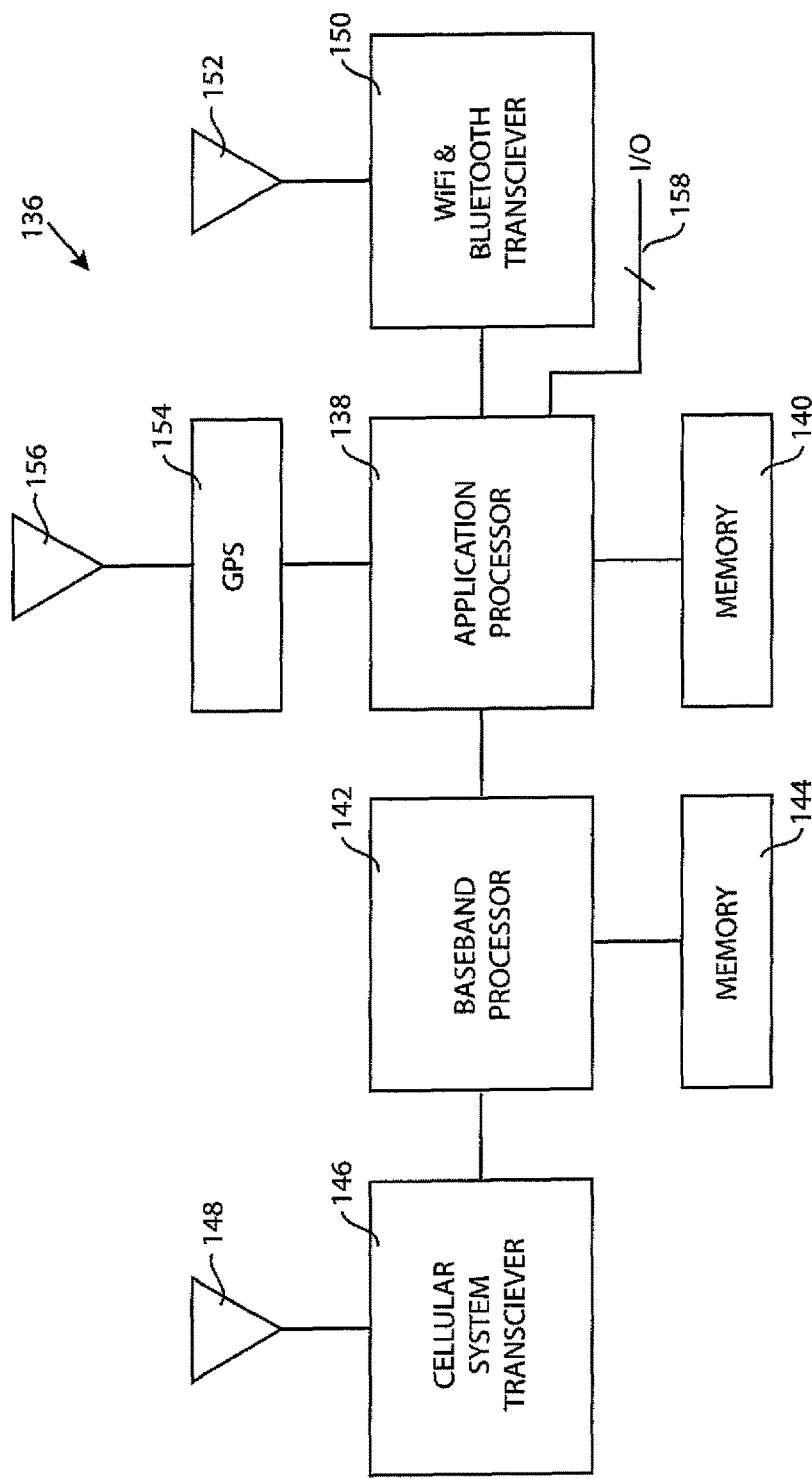
FIG. 8 is a block diagram of an example wireless mobile device and/or an example wireless collector device.

FIG. 8 is a block diagram of the electronic and electrical circuitry 136 of an example wireless mobile device 44, which can also serve as a collector device 48. The circuitry 136 includes an application processor 138 having memory 140 and a baseband processor 142 having memory 140. The baseband processor 142 is coupled to the cellular system transceiver 148 having an antenna 148, and the application processor 138 is coupled to a WiFi and Bluetooth transceiver 150 having an antenna 152. The application processor 138 is also coupled to a GPS module 154 having an antenna 156, and to an I/O bus 158 coupled to a multi-pin connector.

Figure 9:
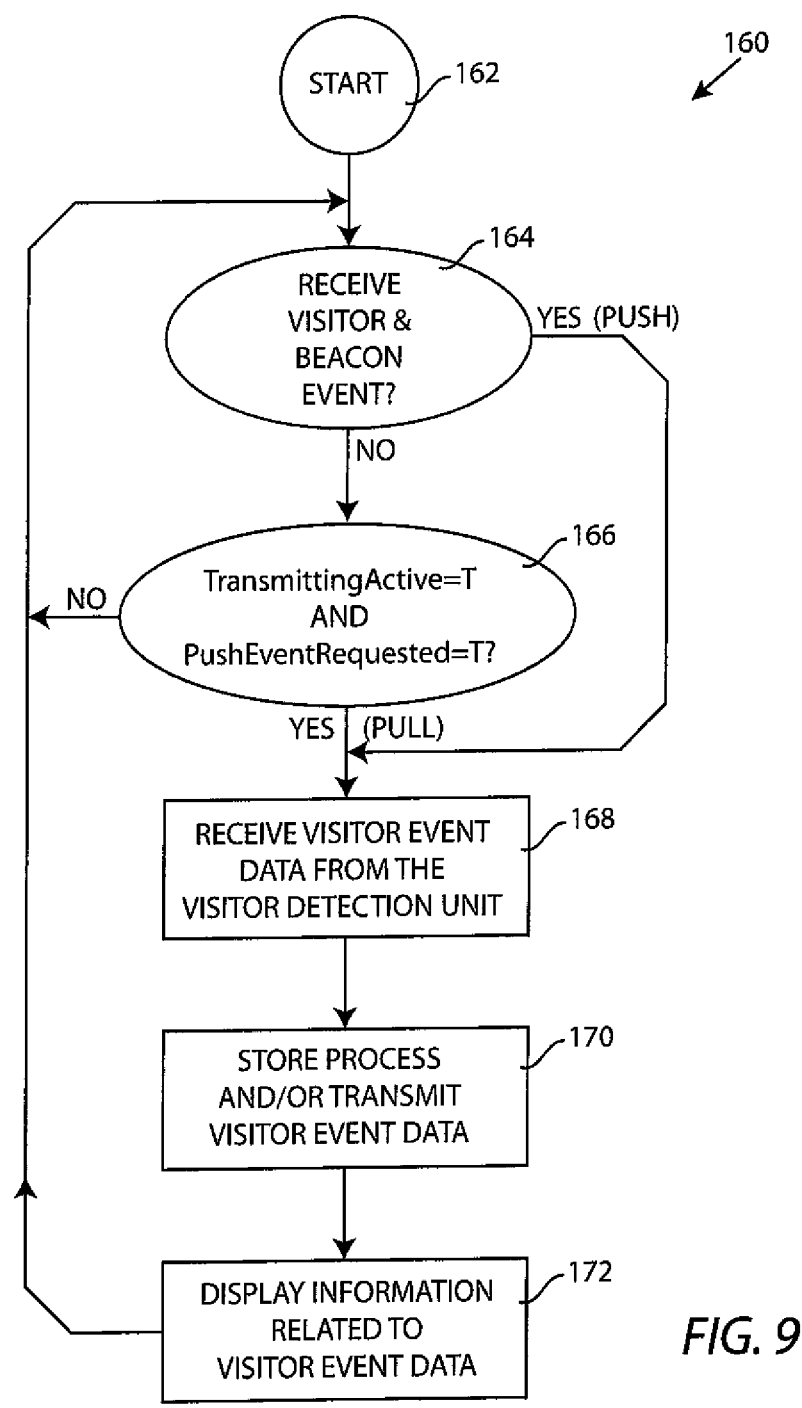
FIG. 9 is a flow diagram of an example process operating on a wireless collector device.

FIG. 9 is a flow diagram of an example process 160 operating on example collector device 48. Process 160 begins at 162 and, in a decision operation 164, it is determined if a visitor iBeacon event has been received ("a push"). If not, it is determined if a "pull" is desired by checking whether flags TransmittingActive and PushEventRequested are true. If not, then process control is returned to operation 164. If either a push or a pull is initiated, than an operation 168 receives visitor event data from the visitor detection unit 10. Next, in an operation 170, the visitor event data is stored, processed and/or transmitted to another device or server. Finally, in an optional operation 172, the collector device (such as an iPad®) can display information related to the visitor event data.

Figure 10:
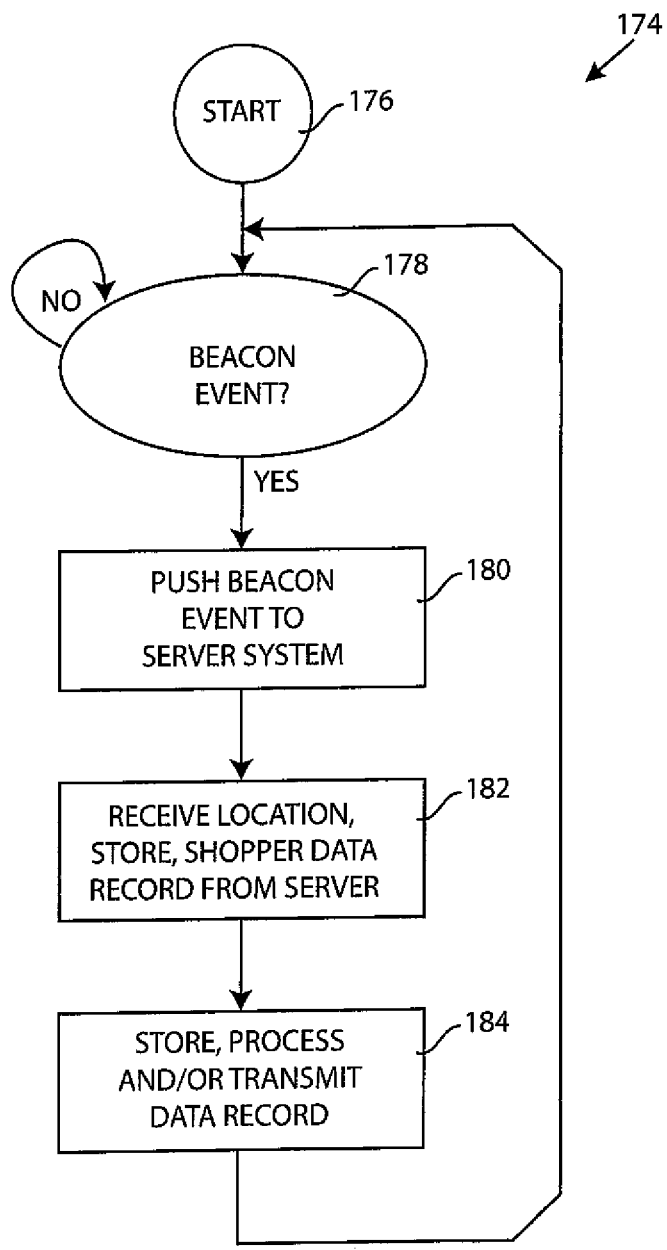
FIG. 10 is a flow diagram of an example process operating on a wireless mobile device.

FIG. 10 is a flow diagram of an example process 174 which can operate on a wireless mobile device 44 such as an iPhone® smartphone. This process 174 can be implemented by an application ("app"), loaded onto the wireless mobile device, which has been enhanced with a Software Design Kit (SDK) to be responsive to an iBeacon sent from a visitor detection unit 10, by way of a non-limiting example. The process 174 begins at 176 and, in a step 178, it is determined if there is an iBeacon event that is related to the apps SDK. If so, the iBeacon event is pushed to a server in an operation 180, such as system server 58, over the Internet 56. Next, SDK code segments retrieve data from the system server 58, such as location, store and shopper data, in an operation 182. Finally, in this non-limiting example, SDK code segments store, process and/or transmit some or all of the downloaded data, (e.g. to the visitor detection unit 10 via a BLE channel) in an operation 184 before process control is returned to operation 178. As described previously, an SDK is only one way of providing code segments which are executed by the microcontroller to perform the processes set forth herein, with alternate embodiments providing such code segments as part of, for example, an operating system, application API, utility, etc.

Figure 11:
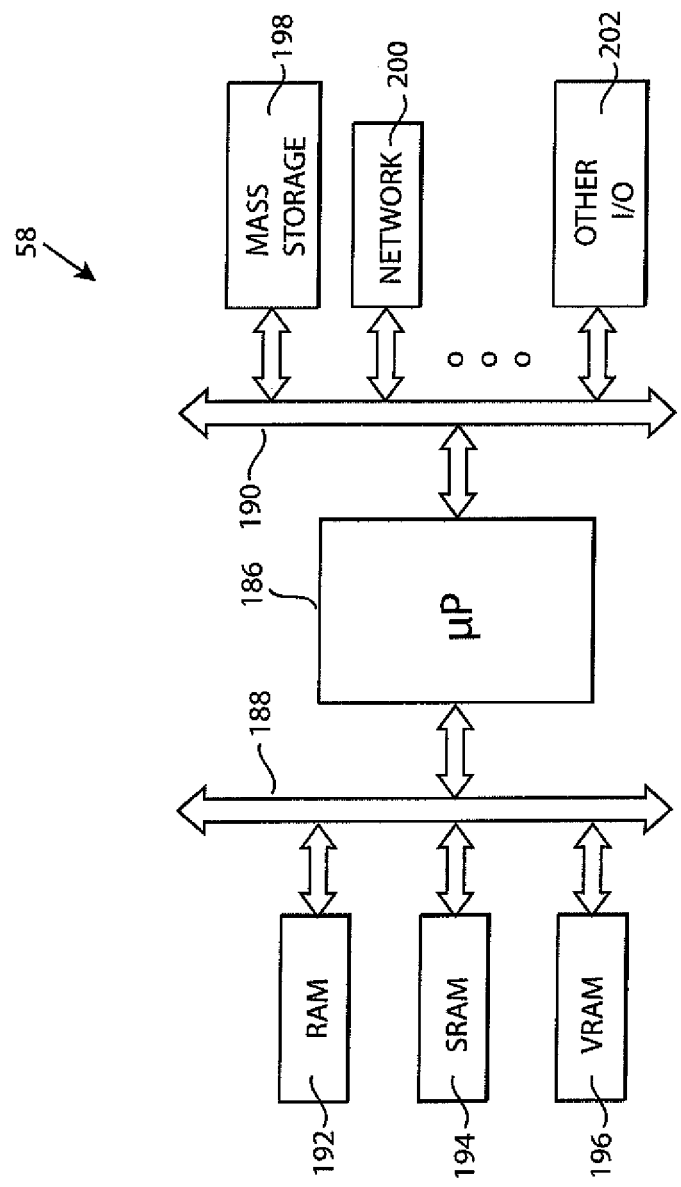
FIG. 11 is a block diagram of the hardware components of an example system server.

FIG. 11 is a simplified block diagram of an example system server 58 suitable for use in system 46 of FIG. 4. By way of non-limiting example, system server 58 includes a microprocessor 186 coupled to a memory bus 188 and an input/output (I/O) bus 190. A number of memory and/or other high speed devices may be coupled to memory bus 188 such as the RAM 192, SRAM 194 and VRAM 196. Attached to the I/O bus 190 are various I/O devices such as mass storage 198, network interface 200, and other I/O 202. As will be appreciated by those of skill in the art, there are a number of non-transitory computer readable media available to the microprocessor 186 such as the RAM 192, SRAM 194, VRAM 196 and mass storage 198. The network interface 200 and other I/O 202 also may include computer readable media such as registers, caches, buffers, etc. Mass storage 198 can be of various types including hard disk drives, optical drives and flash drives, to name a few. It will also be appreciated that system server 58 can include multiple servers, load balancers, etc.

Figure 12:
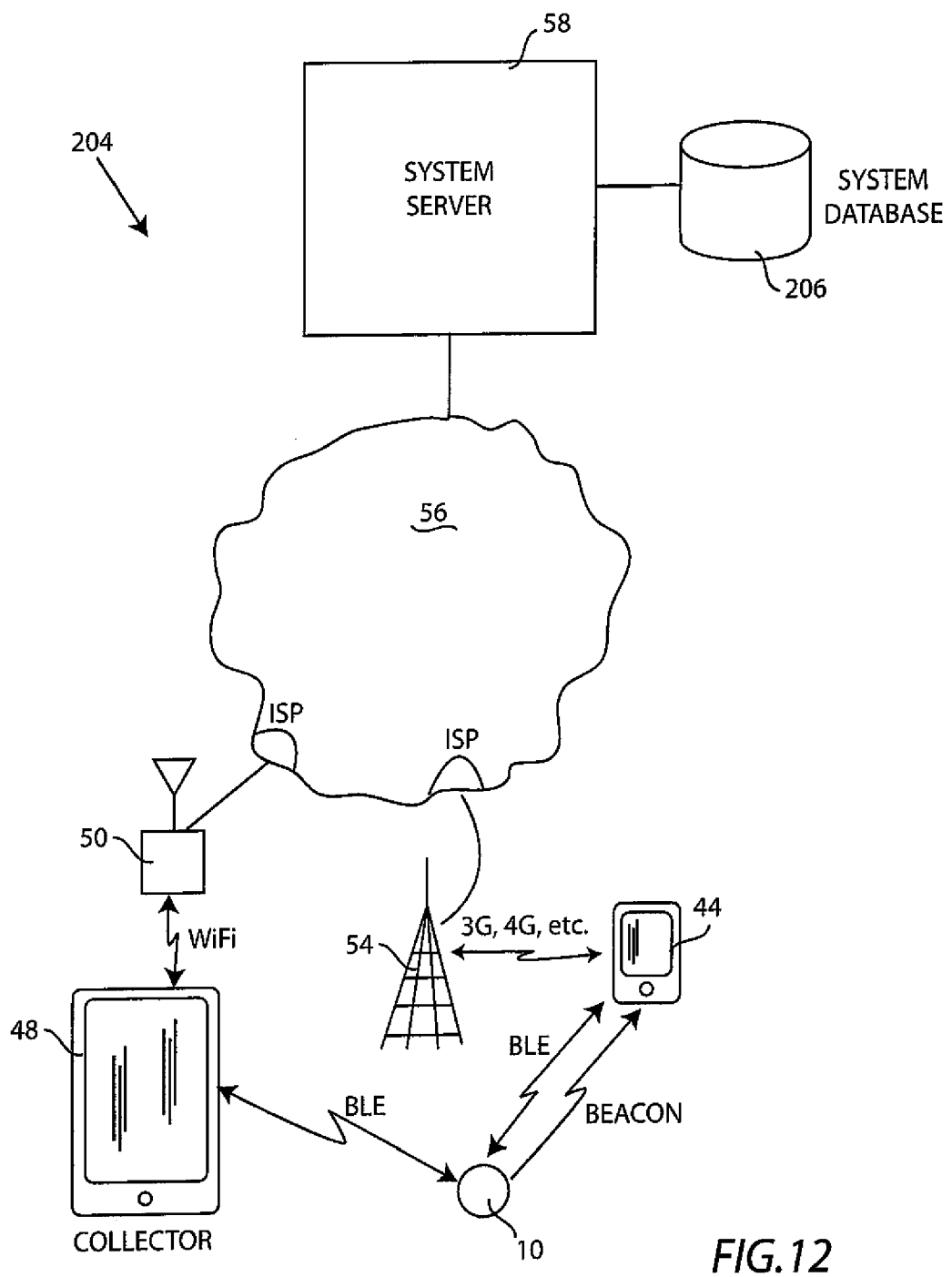
FIG. 12 is an illustration of example communication channels between a system server, a wireless mobile device, a collector device, and a visitor detection unit.

FIG. 12 is an illustration of example communication channels between system server 58, wireless mobile device 44, collector device 48 and visitor detection unit 10. As noted previously, the visitor detection unit 10 can transmit an iBeacon that can activate the SDK of an app running on wireless mobile device 44 which then communicates using BLE with the visitor detection unit 10. The visitor detection unit 10 can also communicate with collector (which can run its own form of SDK if it is, for example, an iPad) by BLE transmission. The wireless mobile device 44 and the collector 48 are each, in this example, coupled to an Internet Service Provider (ISP) of the Internet 56 by a cellular system 54 and by a WiFi hub 50, respectively, to communicate with the system server 58 running the system server processes such as, by way of non-limiting example, the system server process 208 of FIG. 13. A system database 206 can be coupled to the system server 58 to store the data about the stores and its visitors.

By way of non-limiting example, the system database 206 can include a customer profile database, a location database and a point-of-sale (POS) database. For example, the customer profile database can include an arbitrary identifier (e.g. SwarmID), email and demographics information, the top categories of stores visited by the customer, the top brands purchased by the customer, and specific campaigns and coupons. The location database can include a Business ID, visitor events, iBeacon events, presence data, Department ID, store address, store name, store type, store categories, brands and store campaigns. The POS database can include transactions, inventory/SKUs, pricing, and sales.

The customer profile database portion of the system database 206 can also include a collective intelligence database which combines data from multiple sources to provide the best intelligence concerning the buying habits of known individuals. It will be appreciated that the customer profile is built around a persistent identifier, such as a device ID, an arbitrary identifier (e.g. SwarmID), email contained within an app embedding an appropriate SDK (software design kit) code segments, etc. The customer profile can include a customer's history derived from, for example, POS data, lengths of prior visits to stores, etc. In certain example embodiments, a customer profile can be analogized to a browser "cookie" used by servers and other online devices to customize and enhance the customer's shopping experience.

Figure 13:
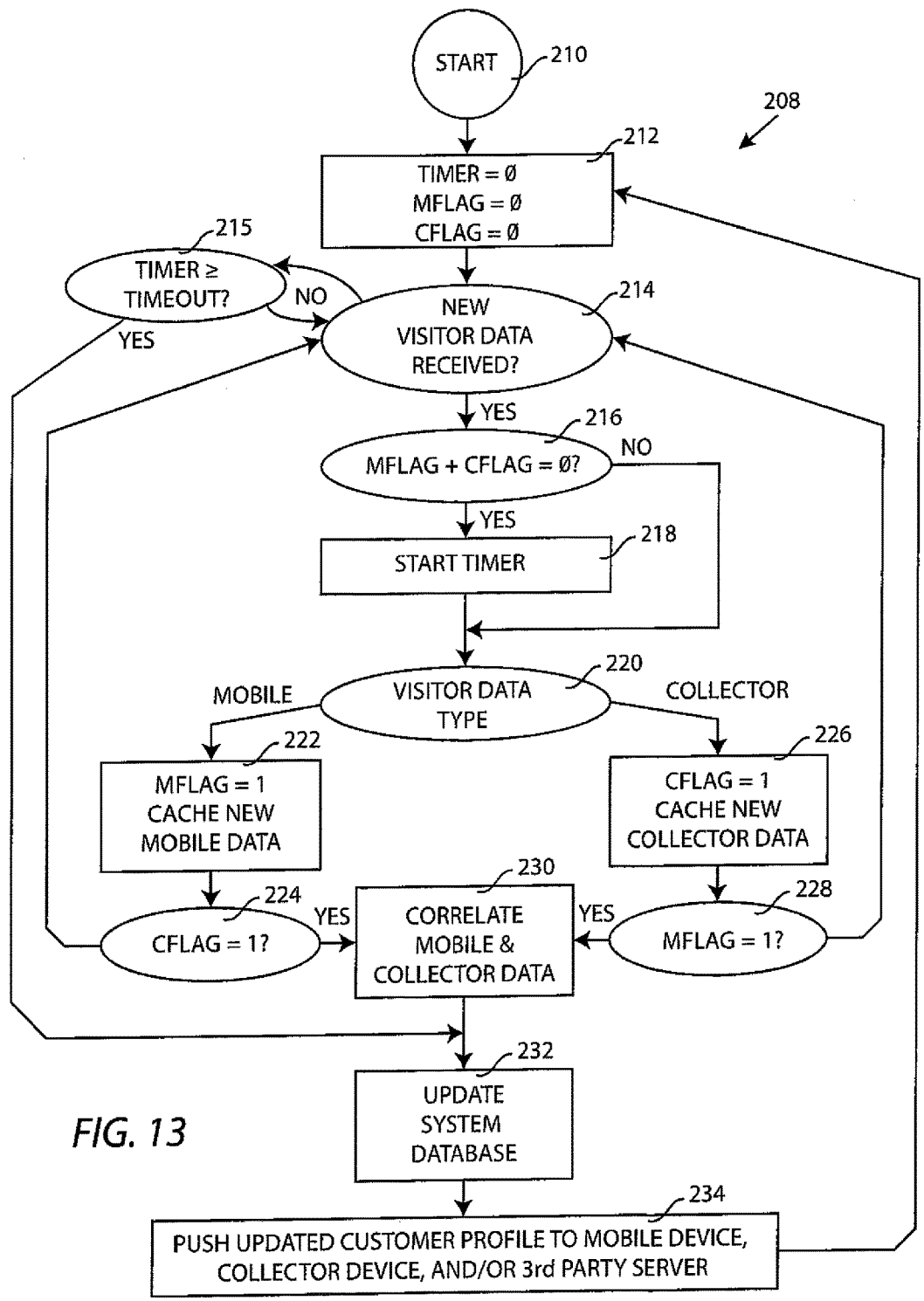
FIG. 13 is a flow diagram of an example process operating on the system server of FIG. 11.

FIG. 13 is a flow diagram of process 208, set forth by way of example and not limitation, which can be implemented by the system server 58. The process 208 begins at 210 and, in an operation 212, variable TIMER and flags MFLAG and CFLAG are set to zero. Next, in an operation 214, it is determined if new visitor data is received from either a wireless mobile device or a collector associated with the wireless mobile device. If not, operation 214 idles awaiting new visitor data or a timeout (e.g. TIME≥TIMEOUT, where TIMEOUT is a constant) as determined by an operation 215. If there is new visitor data, an operation 216 determines if MFLAG and CFLAG are both zero, signifying that this is brand new visitor data not pushed either from the wireless mobile device nor the collector with which it is associated, which starts a timer in an operation 218. The timer is used so that the wireless mobile data and the collector data, which may arrive at slightly different times, can be correlated. However, if data is not received from both the wireless mobile device and the collector device within a time period TIMEOUT, the process will be able to continue with the data that it has. In certain non-limiting examples, TIMEOUT is a constant in the range of a fraction of a second to a few seconds.

Next, in a decision operation 22 the process branches based upon data type. If the data type is MOBILE (from the wireless mobile device), an operation 222 sets MFLAG:=1, and the mobile data is cached. It should be noted that this may not be the first time that mobile data had been received at operation 222 and that it may be cached with other mobile data. Next, in an operation 224, it is determined if CFLAG=1, signifying that both mobile data and corresponding collector data have been received. If not, then control returns to operation 214 to await the receipt of new visitor data or a timeout.

If operation 220 determines that the visitor data type is COLLECTOR, an operation 226 sets the flag CFLAG:=1 and caches the collector data. Again, it should be noted that this may not be the first time that collector data had been received at operation 226 and that it may be cached with other collector data. Next, in an operation 228, it is determined if MFLAG=1, signifying that both mobile data and corresponding collector data have been received. If not, then control returns to operation 214 to await the receipt of new visitor data or a timeout.

If it has been determined by either operation 224 or 228 that both mobile data and corresponding collector data have been received, the data is correlated in an operation 230. For example, where the data is consistent, the data is combined as metadata of the visitor event, and where the data is inconsistent, the inconsistencies are reconciled. By way of non-limiting example, at least one of user information, application information, and device information received from the wireless mobile device with the visitor event data received from the collector device are correlated to produce multisource correlated data for an identifiable individual.

Operation 232 updates a customer profile database for the visitor who triggered the visitor event. This operation 232 may be initiated by the timeout operation 215, in which case it received the visitor event from either the wireless mobile device or the collector device, but not both, during the timeout period, or the operation 232 may be initiated with the correlated mobile and collector data created by operation 230. In either event, either a new customer profile is created for a new, unrecognized visitor, or an existing customer profile is updated with the new visitor event metadata and stored in the customer profile database.

Finally, an operation 234 pushes the updated customer profile to one or more recipient devices over the Internet. For example, the updated customer profile may be pushed to the wireless mobile device, the collector, or to one or more third party servers. It should be noted that process 208 provides for continual updates of customer profiles as they approach and enter, for example a store.

It should be noted that the process 208 can provide virtually real-time updates of customer profiles to, by way of non-limiting examples, the wireless mobile device and/or collector device from which the data was received. The virtually real-time updates of customer profiles can also be provided to third party servers, e.g. advertisement ("ad") servers. By "real-time" it is meant that there is little or no intentional delay in pushing updated customer profiles to the desired devices and/or servers. However, due to latency issues inherent with Internet communication as well as the processing time required by operation 208, it will be appreciated that "real-time" can range from a fraction of a second, to a number second to, in extreme cases, a few minutes.

Therefore, as used herein, "real-time" will mean that devices (such as wireless mobile devices, collector devices, third party servers, etc.) will receive updated customer profiles in a not-intentionally-delayed fashion after the triggering of the visitor event such that the system can interact with identifiable individual visitors in an enhanced and intelligent fashion. That is, visitors are preferably identified as particular individuals with customer profiles as quickly as possible in real-time.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A system configured for detecting and communicating with a client device, the system comprising:
   a visitor detection unit comprising circuitry configured to:
      detect a visitor event via a sensor,
      generate visitor event metadata based on the visitor event,
      periodically transmit a beacon signal proximate a merchant portal for detecting a beacon response event issued by the client device,
      periodically detect the beacon response event indicating presence of the client device proximate the merchant portal,
      generate beacon response event metadata based on the beacon response event, and
      transmit the visitor event metadata and the beacon response event metadata; and
   a system server disposed in communication with a system database comprising consumer data and a plurality of promotions, the system server comprising server circuitry configured to;
      receive the visitor event metadata and the beacon response event metadata from the visitor detection unit,
      retrieve, from the system database, consumer data associated with the client device based on the visitor event metadata and the beacon response event metadata,
      determine a selected promotion from the plurality of promotions based on the consumer data associated with the client device, and
      transmit to the client device the selected promotion.

2. The system of claim 1, further comprising a third party server disposed in communication with a merchant database comprising merchant data, configured to:
   receive the consumer data associated with the client device from the system server;
   retrieve, from the merchant database, the merchant data based on the consumer data associated with the client device;
   transmit the merchant data to the system server, wherein the system server further configured to:
      determine a merchant selected promotion from the plurality of promotions based on the consumer data associated with the client device and the merchant data; and
      transmit to the client device the merchant selected promotion.

3. The system of claim 1, wherein the beacon signal comprises a beacon identifier associated with the merchant portal.

4. The system of claim 3, in circumstances where the client device received the beacon signal periodically transmitted from the visitor detection unit and issued the beacon response event, the client device further configured to:
   automatically activate an application comprising an application interface based on the beacon identifier; and
   render the selected promotion for display on the application interface.

5. The system of claim 1, wherein the selected promotion is further associated with a promotion score determined based on the consumer data.

6. The system of claim 2, wherein the merchant selected promotion is further associated with a promotion score determined based on the consumer data and the merchant data.

7. The system of claim 1, wherein the visitor event metadata comprises visitor event type data indicating a direction of travel of the client device, presence data, or visitor event timestamp data.

8. The system of claim 1, wherein the beacon response event metadata comprises client device data, application data, location data, or timestamp data.

9. The system of claim 1, wherein the consumer data comprises consumer profile data, e-mail data, demographics data, historical purchase data, or transaction data.

10. The system of claim 2, wherein the merchant data comprises merchant portal location data, merchant information data, inventory data, pricing data, or promotion data.

11. The system of claim 1, wherein the sensor is a motion detector, a passive infrared (PIR) motion detector, an optical detector, a capacitive detector, a beam detector, a sonic detector, a pressure plate, or a radio-frequency (RF) signal detector.

12. A method for detecting and communicating with a client device, the method comprising:
   detecting, using a visitor detection unit, a visitor event via a sensor;
   generating, using the visitor detection unit, visitor event metadata based on the visitor event;
   periodically transmitting, using the visitor detection unit, a beacon signal proximate a merchant portal for detecting a beacon response event issued by the client device;
   periodically detecting, using the visitor detection unit, the beacon response event indicating presence of the client device proximate the merchant portal;
   generating, using the visitor detection unit, beacon response event metadata based on the beacon response event;
   transmitting, using the visitor detection unit, the visitor event metadata and the beacon response event metadata;
   receiving, using a system server disposed in communication with a system database comprising consumer data and a plurality of promotions, the visitor event metadata and the beacon response event metadata from the visitor detection unit;

retrieving, from the system database, consumer data associated with the client device based on the visitor event metadata and the beacon response event metadata;

determining, using the system server, a selected promotion from the plurality of promotions based on the consumer data associated with the client device; and transmitting, using the system server, the selected promotion to the client device.

13. The method of claim 12, further comprising:

receiving, by a third party server disposed in communication with a merchant database comprising merchant data, the consumer data associated with the client device from the system server;

retrieving, from the merchant database, the merchant data based on the consumer data associated with the client device;

transmitting the merchant data from the third party server to the system server;

determining, using the system server, a merchant selected promotion from the plurality of promotions based on the consumer data associated with the client device and the merchant data; and transmitting, using the system server, the merchant selected promotion to the client device.

14. The method of claim 12, wherein the beacon signal comprises a beacon identifier associated with the merchant portal.

15. The method of claim 14, in circumstances where the client device received the beacon signal periodically transmitted from the visitor detection unit and issued the beacon response event, the method further comprising:

automatically activating an application comprising an application interface based on the beacon identifier on the client device; and rendering the selected promotion for display on the application interface of the client device.

16. The method of claim 12, wherein the selected promotion is further associated with a promotion score determined based on the consumer data.

17. The method of claim 13, wherein the merchant selected promotion is further associated with a promotion score determined based on the consumer data and the merchant data.

18. The method of claim 12, wherein the visitor event metadata comprises visitor event type data indicating a direction of travel of the client device, presence data, or visitor event timestamp data.

19. The method of claim 12, wherein the beacon response event metadata comprises client device data, application data, location data, or timestamp data.

20. The method of claim 12, wherein the consumer data comprises consumer profile data, e-mail data, demographics data, historical purchase data, or transaction data.

21. The method of claim 13, wherein the merchant data comprises merchant portal location data, merchant information data, inventory data, pricing data, or promotion data.

22. The method of claim 12, wherein the sensor is a motion detector, a passive infrared (PIR) motion detector, an optical detector, a capacitive detector, a beam detector, a sonic detector, a pressure plate, or a radio-frequency (RF) signal detector.

* * * * *